United States Patent [19]

Nessel

[11] Patent Number: 4,876,932
[45] Date of Patent: Oct. 31, 1989

[54] CUTTING TOOL HOLDER

[75] Inventor: Eliezer Nessel, Haifa, Israel

[73] Assignee: Iscar Ltd., Nahariya, Israel

[21] Appl. No.: 232,908

[22] Filed: Aug. 16, 1988

[51] Int. Cl.4 .............................................. B23B 27/00
[52] U.S. Cl. ..................................... 82/158; 407/102; 407/90
[58] Field of Search ................. 82/36 R, 158; 407/66, 407/81, 82, 83, 84, 88, 89, 90, 102, 101, 103, 104, 106, 107, 111, 112

[56] References Cited

U.S. PATENT DOCUMENTS 3,889,330  6/1975  Zweekly .............................. 407/106
4,244,666  6/1981  Erickson ............................. 407/107
4,286,901  9/1981  Eckle ................................. 407/11
4,520,701  6/1985  Watomura ........................... 82/158
4,533,283  8/1985  Satron et al. ........................ 407/11

Primary Examiner—Frederick R. Schmidt
Assistant Examiner—Blynn Shideler
Attorney, Agent, or Firm—Burgess, Ryan & Wayne

[57] ABSTRACT

A clamping arrangement for clamping a pin mounted cutting insert on a tool holder by means of a plurality of clamping balls located within a ball guide groove formed in the tool holder and displaceable into a clamping abutment with the insert by means of a ball displacing member articulated to the tool holder.

4 Claims, 7 Drawing Sheets

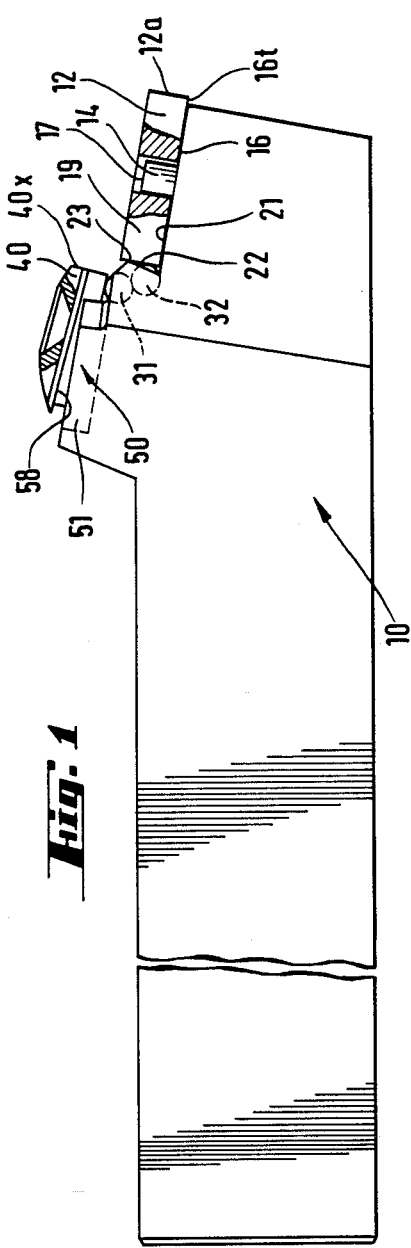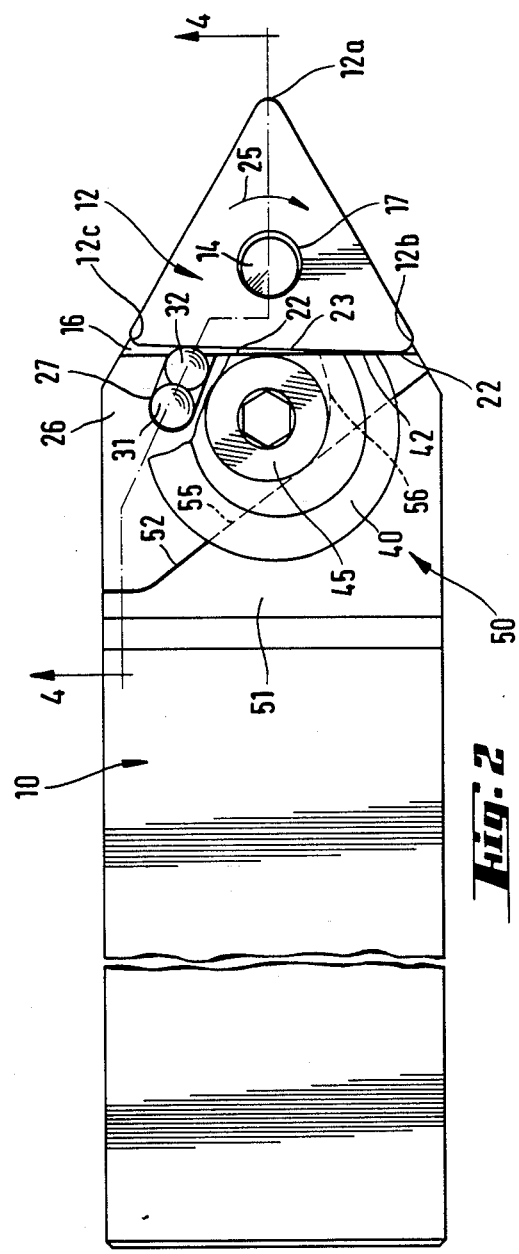

CUTTING TOOL HOLDER

FIELD OF THE INVENTION

This invention relates to a cutting tool assembly wherein a replaceable cutting insert is releasably clamped in an insert seat formed in a tool holder.

BACKGROUND OF THE INVENTION

With known cutting tool assemblies, the replaceable cutting insert is generally of the indexable kind and it is therefore an important requirement for the clamping arrangement that as each cutting edge is indexed into position, it should occupy the exact same position as that occupied by the preceding edge. Furthermore, the clamping arrangement must be such as not to constitute an undesired interference with the controlled flow of the chips produced during cutting.

SUMMARY OF THE INVENTION

It is an object of the present invention to provide, in a cutting tool assembly, a clamping arrangement in which the above referred to desiderata are to a large extent achieved.

According to the present invention there is provided, in a cutting tool assembly, a clamping arrangement for clamping a cutting insert to a tool holder wherein said tool holder is formed at an end thereof with an insert seat defined by a base surface and a transverse side surface; a mounting pin secured to said tool holder and extending out of said base surface so as to have mounted thereon a centrally apertured cutting insert; a ball guide groove formed in said tool holder; a plurality of clamping balls located in said groove; an upper opening of said groove extending along the length thereof in an upper surface of the tool holder adjacent to the insert seat so as to allow for ready introduction of said clamping balls into said groove; a first inner end of said groove constituting a bearing surface for an innermost of said clamping balls; a second outer end of said groove opening into said transverse side surface and having a transverse dimension less than the diameter of an outermost of said clamping balls; a groove base spaced from said upper surface in the region of said first end by a first amount less than the diameter of the innermost clamping ball and, in the region of said second end, by a second amount greater than the first amount; a ball displacing member articulated to said tool holder and juxtaposed with respect to said groove so as to bear on said innermost clamping ball and displacing means for displacing said member towards said tool holder so as to displace said outermost clamping ball into displacing said innermost clamping ball outwardly with respect to said side surface, whereby an insert mounted on said pin and resting on said base surface is clampingly pressed against said pin and is pivoted into clamping engagement with said side and base surfaces.

BRIEF SUMMARY OF THE DRAWINGS

The invention will best be understood from the following description of a specific embodiment when read in conjunction with the accompanying drawings.

FIGS. 1 and 2 are side views of one embodiment of the invention;

DETAILED DESCRIPTION OF A PREFERRED EMBODIMENT

Figure 3:
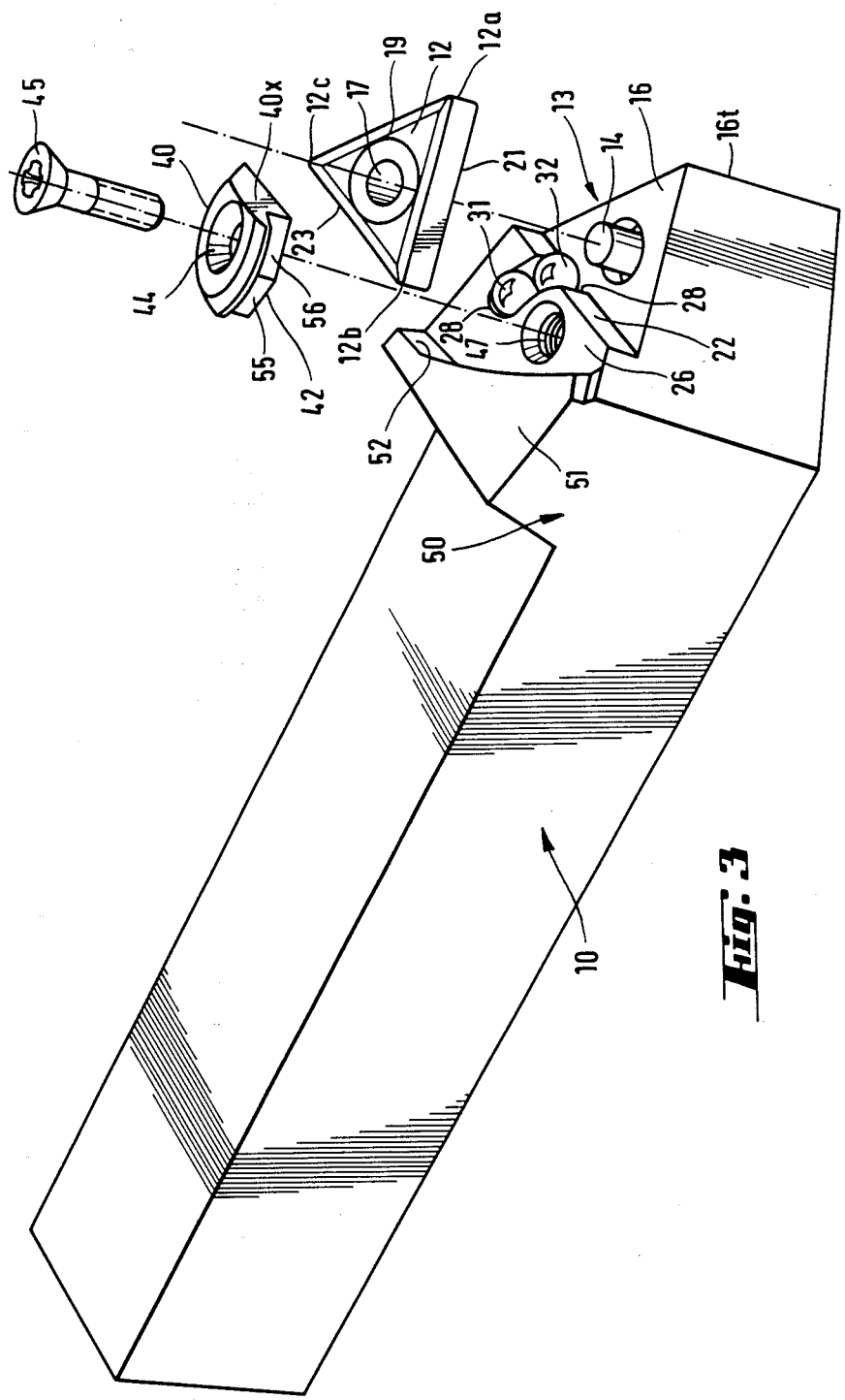
FIG. 3 is an expanded isometric view.

Attention is first directed to FIGS. 1-3 in connection with which a preferred embodiment of the invention will be described. FIGS. 1 and 2 are side and top views of the novel holder 10, designed to support and rigidly secure thereto a cutting insert 12, while FIG. 3 is an expanded isometric view of the holder 10 and the insert 12. In all the Figures, like elements are designated by like numerals.

The holder 10 has a recess 13 (see FIG. 3) constituting a seat and is of the pin supporting type, in that it has a pin 14 which is typically cylindrical and which extends upwardly, perpendicular to a flat surface 16, hereafter also referred to as the first surface, designed to support thereon the insert 12. The latter is shown in the shape of an equilateral triangle with cutting edges 12a-12c, and with a central hole or cavity 17 which extends perpendicularly from the insert's top side 19 to its bottom side 21, which rests on surface 16. For supporting a triangularly shaped insert, such as insert 12, the recess 13 is typically triangularly shaped, so that surface 16 extends from a front tip 16t on which the insert's cutting edge, e.g. 12a, rests, to a rearward edge from which a side wall 22 of the holder extends upwardly.

When the insert 12 rests on surface 16, with edge 12a pointed as the cutting edge, the insert's side 23, extending between cutting edges 12b and 12c, lies adjacent and substantially parallel to side wall 22, hereafter simply referred to as side 22. As long as a locking force is not applied to the insert, it is freely supported on surface 16 about pin 14, in that it is free to partially pivot and move with respect to the pin as well as become disengaged from surface 16.

In accordance with the present invention a locking force is applied to the insert 12 by means of an element which is projectable out of side 22 to push against side 23 of the insert so as to apply a rotational force or torque to the insert. Consequently, the insert pivots about pin 14, as represented in FIG. 2 by arrow 25. As the insert pivots, since its side 23 is very close to side 22, it finally abuts side 22, thus terminating the insert's pivoting motion. However, the locking force also pushes the insert slightly forward until one or more surface points of its cavity 17 presses against pin 14. Thus the insert becomes locked to or secured in the holder by being pressed against it at at least two spaced apart points, in addition to being pressed by the element which causes its initial pivoting. That is, the insert is pressed against side 22 and against pin 14 and against the element which caused it to pivot.

Figure 1A:
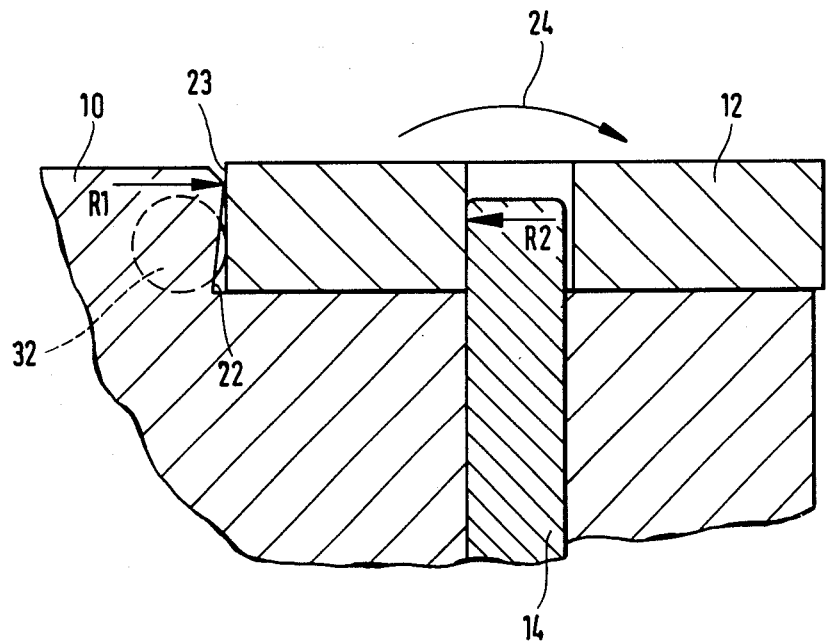
FIG. 1A is a partial cross-sectional view useful in explaining an aspect of the invention.

To further rigidly secure the insert to the holder, side 22 preferably is tilted slightly forward so that when the locking force is applied to the insert as a result of the fact that the point of contact between sides 22 and 23 as represented in FIG. 1A by $R_1$ is at a higher level or plane than the point(s) of contact between pin 14 and hole 17 as represented by $R_2$, a downwardpointing moment is produced, represented in FIG. 1A by arrow 24. This moment causes the insert to be presssed tightly against the front part of the holder surface 16, and thus reduces the likelihood that the insert will move with respect to the holder, due to forces applied to the insert's cutting edge by the workpiece, which is being cut.

As will be described hereafter, in the novel holder 10 a unique locking arrangement is employed to apply the locking force to the insert so as to lock it to the holder. With the unique locking arrangement the locking force can be speedily and easily released to unlock the insert. Once unlocked, the insert can be pulled up and rotated so as to position another of its cutting edges at the cutting position. Similarly, one insert can be easily replaced by another. Due to the novel holder, once it has been properly indexed for a cutting position does not affect the indexing, in that each newly positioned cutting edge assumes the exact location at the cutting position, previously occupied by a previously-positioned cutting edge.

As is appreciated, when cutting into a workpiece, typically metal, a ribbon of metal, often referred to as a chip, is removed during the operation. Various inserts have been developed to remove the ribbon away from the cutting edge so as not to interfere with the cutting operation. One such insert is shown in U.S. Pat. No. 3,187,406. As stated therein, in order not to interfere with the flow of the metal ribbon the use of clamping elements on top of the insert should be minimized if not totally eliminated. As will be pointed out and explained hereafter, in the novel tool holder of this invention with the unique clamping arrangement, the insert can be locked without any element or elements, pressing on top of it for clamping purposes. However, as will be further pointed out, when desired the unique arrangement is positionable to apply a clamping force to the insert top, without interfering with metal ribbon flow. In the art, such metal ribbons are referred to as chips. Such clamping force is provided to further increase the pressing of the insert against tool surface 16 in addition to that provided by the downward directed moment, represented by arrow 24. Such additional force may be found to be desirable to further secure the insert in the holder, particularly when machining in extremely difficult conditions, e.g. hard metals, intermittent cutting, or unstable conditions.

Attention is now directed again to FIGS. 1-3 and particularly to FIG. 3 in connection with which the unique locking-clamping arrangement will be described. From the top of holder side 22 a second surface 26 extends in a direction away from surface 16. A channel 18 is formed to extend from surface 26 to side 22. The channel 18 constitutes a ball guide groove designed to accommodate therein several hardened metal balls of the bearing type. In the Figures only two balls 31 and 32 are shown. The channel is wide enough for the balls to move therein. The channel end, exposed through surface 26, hereafter referred to as the top end, is large enough for the balls to be inserted into the channel therethrough, while the channel end exposed through side 22, hereafter referred to as the bottom end, is narrower than the ball diameter. Thus, balls cannot exit through the channel bottom end. However, a portion of the ball closest to the bottom end, e.g. Ball 32 can extend outwardly from the channel. Clearly, only less than half of ball 32 can extend out of the channel.

Figure 4:
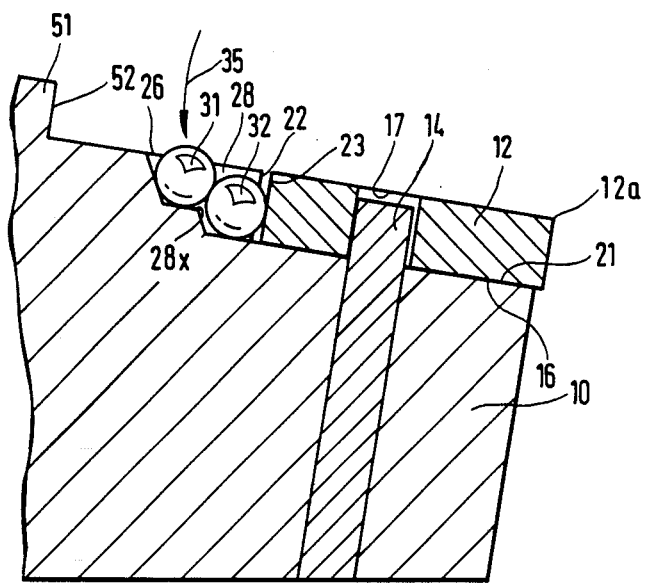
FIG. 4 is a cross-sectional view along lines 4—4 in FIG. 2.

The channel length and the balls' sizes are chosen so that even when ball 32 extends outwardly to the maximum extent possible, part of ball 31 protrudes through and is exposed above surface 26. Furthermore, the channel is shaped to insure that even when a large downward force is applied to ball 31, its centre is always substantially above that of the centre of ball 32. Thus ball 31 always partially rides on and presses against ball 32. This aspect is best shown in FIG. 4 to which reference is made. The latter is a cross-sectional view along lines 4—4 in FIG. 2.

As shown, the bottom of the channel 28 is provided with a ledge 28x, to prevent ball 31 from lowering to the level of ball 32, even when a downward force is applied to ball 31, as indicated by arrow 35. The downward force on the ball 31 will hereafter be referred to as external force 35 or locking force 35.

In practice, the two balls 31 and 32 are inserted into channel 28 through the top end. The balls remain in the channel, and cannot exit the bottom end at holder side 22, since the bottom end is narrower than the diameter of ball 32. However, part of ball 32 is exposed through the bottom end while part of the ball 31 is exposed through the top end at surface 26. In the absence of an external force 35 on ball 31, the only force which is applied to ball 32 by ball 31 is due to gravity. Thus, the balls fit loosely in the channel 28. Even though part of ball 32 may extend out of the channel, it does not interfere with placing the insert 12 over the pin 14, to be supported on surface 16.

When insert 12 is supported on surface 16, the insert side 23 is close to holder side 22 and the surface of the protruding ball 32. As a downward external force 35 is applied to ball 31 it exerts a force on ball 32, urging the latter to extend farther out of the channel bottom end. Since the width of the latter is less than the diameter of ball 32, less than half of ball 32 can protrude out of the channel. When the external force 35 is applied to ball 31, ball 32 extends farther outwardly of the channel and finally comes in contact wit6h insert side 23. When the force 35 on ball 31 is sufficiently large the ball 32 is urged outwardly to an extent sufficient to cause insert 12 to pivot and be locked in the holder, as previously described. Thus, force 35 on ball 31 is transmitted to ball 32 which in turn provides the locking force for the insert. By simply relieving the force 35 from ball 31, the locking force on the insert is removed, and the insert can then be raised above pin 14 to position another of its cutting edges at the desired cutting position, or for replacement purposes.

From the foregoing, it should thus be apparent that in accordance with the present invention the locking of the insert is achievable by applying the external force to an element, other than the insert itself, to achieve insert locking. Furthermore, the force is applied at a point away from the insert top surface 19. Thus, the latter is unobstructed by any clamping elements whatsoever, and therefore any means therein are free to properly direct metal ribbons or chips away from the cutting position.

In accordance with the present invention a washer-like member, which acts as a clamp, and will be hereafter referred to as the clamp member or simply member 40, is provided. The member 40 has a flat bottom side 42 (see FIG. 6) with a central hole 44 extending from its bottom side 42 to its top, in order to enable a bolt 45 to extend therethrough. The clamp member 40 is pressed against the holder 10, as well as against ball 31 by bolt 45 being threaded tightly within threaded hole 47 in holder surface 26. When using a flat head for bolt 45 with an Allan-shaped cavity to receive an Allan ranch, the top end of hole 44 is flared outwardly to accommodate therein the bolt's flat head.

It should be apparent that one can choose the outer dimension of member 40 to be sufficiently large to come in contact with protruding ball 31 when the member 40 is tightened by bolt 45 toward surface 26. Since the ball 31 always protrudes out of surface 26 the member's bottom side 42 can never lie flat against surface 26. However, even when disposed at an angle, side 42 can press on ball 31 when it is urged toward surface 26, and yet be in contact with surface 26. By being pressed against ball 31 member 40 effectively applies the external force 35 to ball 31 which is necessary to push ball 32 farther outwardly and thus lock the insert, as herebefore explained.

If the distance between threaded hole 47 in surface 26 to side 22 is less than the distance from the hole to the top of ball 31, if desired, the member 40 may be truncated, to form a truncated edge 40x and be aligned so that when pressed or clamped by bolt 45, even though it presses on ball 31, it does not extend beyond holder side 22, so as not to protrude over the lockable insert. This facilitates the changing of the cutting edge at the cutting position or insert replacement. However, as will be pointed out hereafter the member 40 may be designed to assume either of two clamped positions, one in which, due to the truncated member edge 40x, it does not project beyond side 22 and thus does not extend over the insert, and one in which part of the member's bottom side 42 actually presses down on the insert, to provide an additional securing force thereto.

In one embodiment actually reduced to practice, the holder 10 is shaped to have a ledge 50 with a top side 51 and a curved side 52 which is at the edge of top surface 26. The curved side 52 acts as a cam and thus will be referred to as the cam 52. Member 40 is shaped to have two cam following sides or faces 55 and 56 which are designed to follow cam 52. Briefly, faces 55 and 56 are formed in a side of member 40 which is recessed inwardly toward hole 44, so that part of the member top defines a ledge 58, which extends outwardly.

Figure 5:
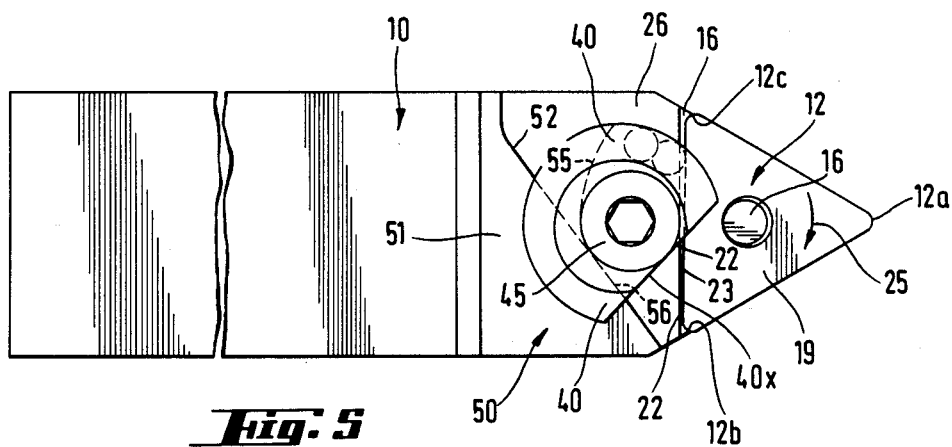
FIG. 5 is another top view.
Figure 6:
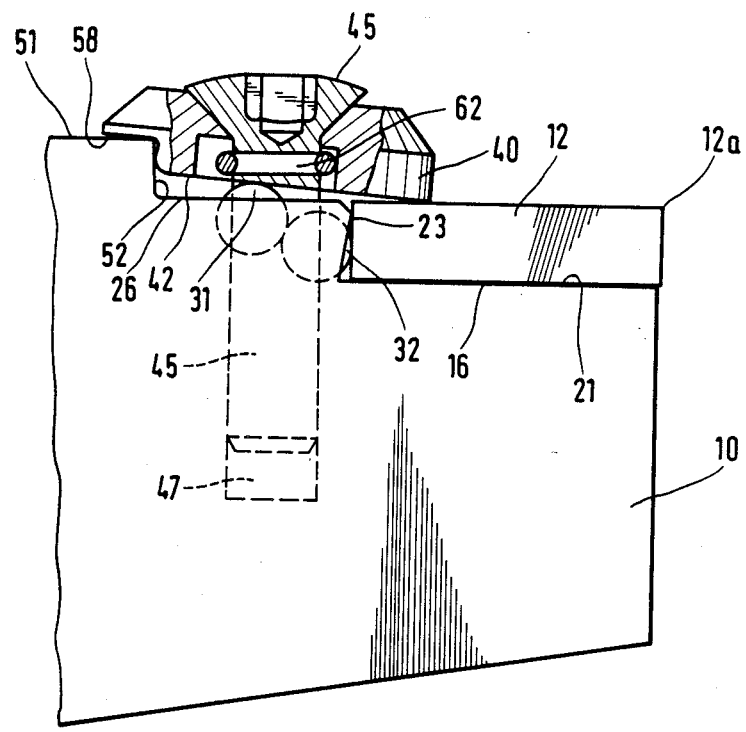
FIG. 6 is a combination side and cross-sectional view, useful in explaining some aspects of the invention.

Face 55 is effectively positioned opposite truncated edge 40x so that when face 55 follows the cam 52 the truncated edge 40x of member 40 is effectively parallel with side wall 22. That is, the member 40 does not extend over the insert, as shown in FIGS. 1 and 2. In this position member 40, in addition to pressing on ball 31 and thus resting on it, is pressed against holder surface 26 and ledge 50. On the other hand, when face 56 follows the cam 52 and member 40 is tightened to the holder 10 by bolt 45, the end of the truncated edge 40x, opposite face 56, is effectively in contact with the top side of the insert and applies a downward clamping force thereto, as shown in FIGS. 5 and 6. In this position, when the bolt 45 is tightened the member 40 is pressed against substantially three point contacts. One is the top ball 31, the second is the top side 19 of the insert, and the third is at or near the edge between faces 51 and 52 of ledge 50. Thus, the member is securely held by being pressed against three spaced apart points, one being the top of ball 31, to which the external force is applied by member 40, and which causes ball 32 to apply the locking force to the insert.

In the embodiment, actually reduced to practice, the hole 44 in member 40, in addition to accommodating the bolt 45 therethrough, is shaped (see FIG. 6) to accommodate a spring washer 62 which is secured to the bolt just below its head. Thus member 40 fits loosely below the bolt head. As the bolt 45 is threaded into hole 47 the loose member 40 is aligned around the bolt so that cam following side 55 abuts against cam 52, and edge 40x is substantially parallel to side 22. As the bolt is further tightened, due to the friction between its head and member 40, the latter tends to rotate with the bolt. Consequently, cam following face 56, rather than face 55, tends to abut against cam 52. Thus, when the bolt is tightly threaded in hole 47, member 40 assumes the position, as shown in FIGS. 5 and 6. That is, an end of its edge 40x presses directly on insert 12, thereby providing the additional clamping force thereto.

As previously pointed out, this additional clamping force is not necessary for most machining operations in order to secure the insert in the holder, since the former is sufficiently secured by locking force provided by ball 32. However, when an additional force is needed or deemed desirable, such as when operating under difficult conditions, the additional force may be provided by the member 40, acting as a top clamp on only a limited surface area of the insert.

If, however, the additional force is not required, the operator, when tightening the bolt 45, can place his finger against the member's truncated edge 40x and thus overcome the rotating force to which the member 40 is subjected by being pressed against the rotating head of bolt 45. Thus, in such a case cam following face 55 abuts against the cam 52 and the member 40 is clamped onto ball 31, surface 26 and the edge between ledge faces 51 and 52. However, it does not touch the insert. Such a clamped member position is shown in FIGS. 1 and 2.

I claim:

1. In a cutting tool assembly, a clamping arrangement for clamping a cutting insert to a tool holder wherein said tool holder is formed at an end thereof with an insert seat defined by a base surface and a transverse side surface; a mounting pin secured to said tool holder and extending out of said base surface so as to have mounted thereon a centrally apertured cutting insert; a ball guide groove formed in said tool holder; a plurality of clamping balls located in said groove; an upper opening of said groove extending along the length thereof in an upper surface of the tool holder adjacent to the insert seat so as to allow for ready introduction of said clamping balls into said groove; a first inner end of said groove constituting a bearing surface for an innermost of said clamping balls; a second outer end of said groove opening into said transverse side surface and having a transverse dimension less than the diameter of an outermost of said clamping balls; a groove base spaced from said upper surface in the region of said first end by a first amount less than the diameter of the innermost clamping ball and, in the region of said second end, by a second amount greater than the first amount; a ball displacing member articulated to said tool holder and juxtaposed with respect to said groove so as to bear on said innermost clamping ball and displacing means for displacing said member towards said tool holder so as to displace said outermost clamping ball into displacing said innermost clamping ball outwardly with respect to said side surface, whereby an insert mounted on said pin and resting on said base surface is clampingly pressed against said pin and is pivoted into clamping engagement with said side and base surfaces.

2. A clamping arrangement according to claim 1, wherein said ball displacing member is constituted by a disc-like washer mounted on said tool holder above said ball guide groove.

3. A clamping arrangement according to claim 2, wherein said washer is so shaped as to remain clear of said insert.

4. A clamping arrangement according to claim 2 wherein said displacing means is constituted by a screw bolt extending through said washer into a tapped bore in the holder.

* * * * *